US012567549B2

(12) United States Patent
Ji et al.

(10) Patent No.: US 12,567,549 B2
(45) Date of Patent: Mar. 3, 2026

(54) CONTACTOR AND AIR CONDITIONING SYSTEM

(71) Applicant: Xiamen Hongfa Electrical Safety & Controls Co., Ltd., Xiamen (CN)

(72) Inventors: Xiaoju Ji, Xiamen (CN); Xiaoming Ke, Xiamen (CN); Rencan Huang, Xiamen (CN); Xieli Zhang, Xiamen (CN)

(73) Assignee: Xiamen Hongfa Electrical Safety & Controls Co., Ltd., Xiamen (CN)

( * ) Notice: Subject to any disclaimer, the term of this patent is extended or adjusted under 35 U.S.C. 154(b) by 226 days.

(21) Appl. No.: 18/113,290

(22) Filed: Feb. 23, 2023

(65) Prior Publication Data

US 2024/0177955 A1 May 30, 2024

(30) Foreign Application Priority Data

Nov. 30, 2022 (CN) ......................... 202211525042.8

(51) Int. Cl.
*H01H 50/12* (2006.01)
*F24F 1/20* (2011.01)
*H01H 50/06* (2006.01)

(52) U.S. Cl.
CPC ............... *H01H 50/12* (2013.01); *F24F 1/20* (2013.01); *H01H 50/06* (2013.01)

(58) Field of Classification Search
CPC ........ H01H 50/12; H01H 50/06; H01H 9/042; H01H 50/02; H01H 50/023; H01H 50/546; F24F 1/20

(Continued)

(56) References Cited

U.S. PATENT DOCUMENTS

2019/0058269 A1* 2/2019 Lee .................... H01R 13/4364
2020/0126741 A1* 4/2020 Lee ........................ H01H 9/443

(Continued)

FOREIGN PATENT DOCUMENTS

CN 2879005 Y 3/2007
CN 212848220 U 3/2021

(Continued)

OTHER PUBLICATIONS

Chinese First Notice of Examination dated Oct. 15, 2025, in connection with Chinese Application No. 202211525042.8, with English translation thereof.

*Primary Examiner* — Shawki S Ismail
*Assistant Examiner* — Lisa N Homza
(74) *Attorney, Agent, or Firm* — Wolf, Greenfield & Sacks, P.C.

(57) ABSTRACT

The disclosure provides a contactor and an air conditioning system. The contactor includes a main body, a first electrical terminal, a second electrical terminal, a contact support, and a refrigerant blocking structure. The contact support is at least partially arranged in the main body and arranged between the first electrical terminal and the second electrical terminal. The contact support is configured such that a power received by the first electrical terminal from a power grid is at least partially transmitted to a load through the second electrical terminal when activated. The refrigerant blocking structure is arranged on a side of the main body toward the contact support, and the refrigerant blocking structure, the contact support, and the opening are arranged correspondingly, and the refrigerant blocking structure at least partially surrounds an outside of the contact support for blocking a flame generated by igniting of a refrigerant.

16 Claims, 13 Drawing Sheets

A-A

(58) Field of Classification Search
USPC .......................................................... 335/202
See application file for complete search history.

(56) References Cited

U.S. PATENT DOCUMENTS

| | | | | |
|---|---|---|---|---|
| 2021/0247096 | A1* | 8/2021 | Hovardas | F24F 13/20 |
| 2023/0061652 | A1* | 3/2023 | Liao | H01H 1/0015 |
| 2023/0307201 | A1* | 9/2023 | Priest | H01H 50/02 |
| 2025/0006446 | A1* | 1/2025 | Ji | H01H 50/54 |

FOREIGN PATENT DOCUMENTS

| | | | |
|---|---|---|---|
| CN | 214068649 | U | 8/2021 |
| CN | 218769309 | U | 3/2023 |
| JP | 2004-286291 | A | 10/2004 |

* cited by examiner

A-A

CONTACTOR AND AIR CONDITIONING SYSTEM

CROSS REFERENCE

The present disclosure claims the priority of the Chinese Patent Application No. 202211525042.8, filed Nov. 30, 2022, the content of which is incorporated herein by reference in its entirety.

TECHNICAL FIELD the disclosure generally relates to the technical field of air conditioner, and in particular to a contactor and an air conditioning system.

BACKGROUND

The existing air conditioning systems are widely used in residential or commercial buildings and other fields. The air conditioning systems need to use a refrigerant for heat exchange, to achieve the purpose of controlling indoor temperature. Initially, refrigerants with high global warming potential (GWP) (such as R410A, etc.) are used as refrigerants, which have great impact on the environment, so it is necessary to replace them with a refrigerant with lower GWP, such as A2L refrigerant.

The contact components of traditional AC contactors will generate electric arc in the process of turning on or off, and the generated energy is enough to ignite the refrigerant, so the traditional contactors belong to the potential ignition source. However, A2L refrigerant, as a low combustible refrigerant, may be ignited by a potential ignition source and explode under certain conditions. Therefore, A2L refrigerant has certain risks and low safety when used in air conditioning systems.

SUMMARY

The disclosure provides a contactor and an air conditioning system, which reduce the risk of refrigerant self-ignition and have good safety.

According to a first aspect of the disclosure, a contactor is provided, which comprises:

a main body provided with an opening;

a first electrical terminal, arranged on the main body;

a second electrical terminal, arranged on the main body;

a contact support, at least partially arranged in the main body and arranged between the first electrical terminal and the second electrical terminal, the contact support being configured to be electrically connected to the first electrical terminal and the second electrical terminal when activated, such that a power received by the first electrical terminal from a power grid is at least partially transmitted to a load through the second electrical terminal;

a refrigerant blocking structure, arranged on a side of the main body facing the contact support, and the refrigerant blocking structure, the contact support, and the opening being arranged correspondingly, and the refrigerant blocking structure at least partially surrounding an outside of the contact support for blocking a flame generated by igniting of a refrigerant.

In some embodiments, the refrigerant blocking structure includes:

an extension member, arranged along an edge of the opening and protrudes on an inner side of the main body in a direction toward the contact support.

In some embodiments, the opening has a rectangular structure, and the first electrical terminal and the second electrical terminal are respectively arranged on two sides of an edge of a long side of the opening; and the extension member is arranged along the edge of the long side of the opening.

In some embodiments, the refrigerant blocking structure further includes:

a function member, arranged along an edge of a short side of the opening and arranged on the inner side of the main body.

In some embodiments, the main body includes:

a housing, the contact support, the first electrical terminal, and the second electrical terminal are at least partially arranged in the housing;

a cover plate covering the housing, the opening and the refrigerant blocking structure are arranged in the cover plate; and wherein the function member is a reinforcing rib or a rim arranged on an inner side of the cover plate.

In some embodiments, along a moving direction of the contact support, a height of the function member is less than or equal to a height of the extension member.

In some embodiments, the contactor further comprises a guide stopper (limiting element) arranged on a side of the function member toward the contact support, and the guide stopper is used for limiting and guiding the contact support.

In some embodiments, the guide stopper has an L-shaped structure or a U-shaped structure.

In some embodiments, the extension member is provided with an avoidance slot for avoiding the guide stopper.

In some embodiments, both the cover plate of the main body and the refrigerant blocking structure are made of at least one of a self-lubricating material and a wear-resistant material.

In some embodiments, the main body and the refrigerant blocking structure are integrally formed.

In some embodiments, the main body includes an upper surface, the opening is arranged on the upper surface, and a top surface of the contact support is always located below the upper surface.

In some embodiments, a side of the contact support toward an inner side of the opening is provided with a wear-resistant damping member.

In some embodiments, a gap is arranged between the refrigerant blocking structure and the contact support, and an effective opening size of the gap is less than or equal to a threshold size of a standard opening limit.

In some embodiments, the threshold size of the standard opening limit is $22.3\times S_u^{-1.09}$ (in mm);

$S_u$ represents a burning rate of a refrigerant in cm/s.

In some embodiments, a plurality of first electrical terminals and a plurality of second electrical terminals are provided, and one contact support, the plurality of first electrical terminals, and the plurality of second electrical terminals are correspondingly arranged.

According to a second aspect of the disclosure, an air conditioning system is provided, which comprises the above contactor.

In some embodiments, the air conditioning system further comprises an outdoor unit, and the contactor is electrically connected to the outdoor unit for controlling a power supplied to the outdoor unit.

The disclosure has the following advantages or beneficial effects:

In the contactor provided by the disclosure, the contact support is arranged in the main body and between the first electrical terminal and the second electrical terminal, such that the first electrical terminal is selectively electrically connected to the second electrical terminal for turning the electrical connection between the first electrical terminal and the second electrical terminal on or off. When the contact support is activated, the first electrical terminal receives a power from a power grid, and then transmits at least part of the power to a load such as an outdoor unit; and when the contact support is not activated, a path for transmitting power to the load is cut off for controlling the power supplied to the load such as the outdoor unit.

The refrigerant blocking structure, the contact support, and the opening are arranged correspondingly, and the refrigerant blocking structure is arranged on an inner side of the main body toward the contact support, which is equivalent to the refrigerant blocking structure is arranged at a position corresponding to the opening and arranged on an inner side of the main body, the refrigerant blocking structure is arranged in a direction toward the contact support, and the refrigerant blocking structure at least partially surrounds an outside of the contact support, playing a role of surrounding and encircling the contact support, such that during the entire the movement process of the contact support, the opening can satisfy the limit requirements corresponding to A2L refrigerant. If there is no refrigerant blocking structure, when the contact support moves to a certain position, the limit of the opening will exceed the standard opening limit. Meanwhile, the size of the opening can be maintained without being reduction, and the top surface of the contact support can be observed outside the main body, which is beneficial to a quick maintenance by the operator, the fault, such as a contact fusion in the contactor, can be eliminated without disassembly, so as to solve a fault such as the contact support being stuck and facilitate subsequent production and maintenance.

Therefore, for an air conditioning system using A2L refrigerant, the contactor provided by the disclosure is a non-potential ignition source, which does not have the conditions to ignite a refrigerant, and can satisfy dual functions of blocking the flame generated by igniting of the refrigerant and facilitating user observation and troubleshooting.

The air conditioning system provided by the disclosure comprises the contactor for controlling the power supplied to the outdoor unit, and the potential ignition of the refrigerant can be alleviated by using the contactor.

BRIEF DESCRIPTION OF THE DRAWINGS

In order to better understand the disclosure, please refer to the embodiments shown in the following drawings. The components in the drawings are not necessarily proportional, and the related components may be omitted, so as to emphasize and clearly explain the technical features of the disclosure. In addition, relevant elements or components may be arranged differently as known in the art. Furthermore, in the drawings, the same reference numerals represent the same or similar components in each of the drawings. The above and other features and advantages of the disclosure will become more apparent by detailed description of the exemplary embodiments with reference to the accompanying drawings.

Wherein.

Figure 1:
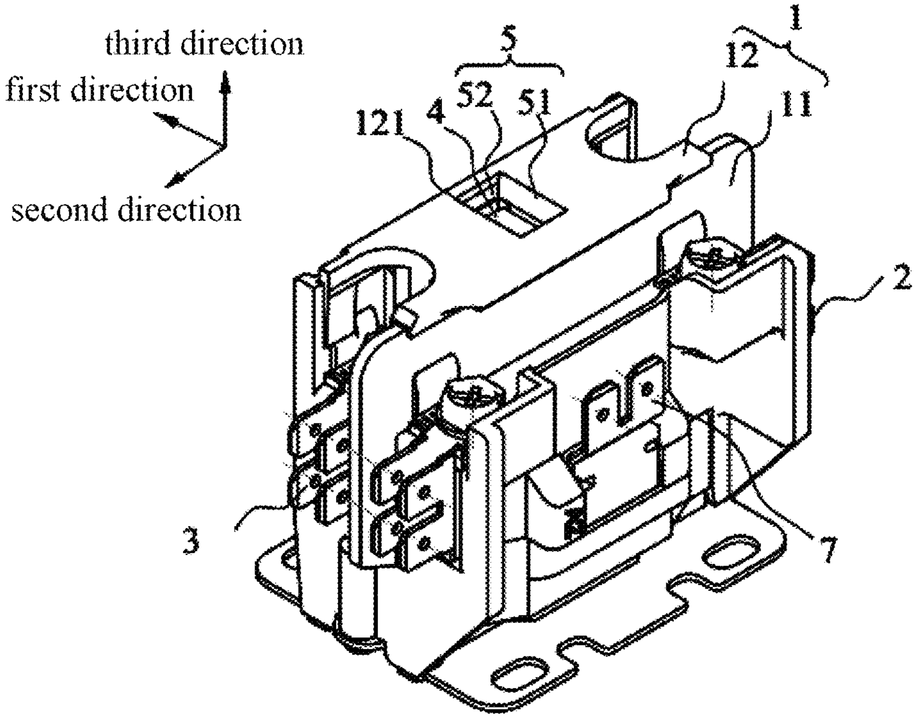
FIG. 1 is a first structural schematic view showing a contact support in an activated state in the contactor provided by a first embodiment of the disclosure.

In the drawings, the reference numerals are explained as follows:

100: Gap;

1: Main Body; 2: First Electrical Terminal; 3: Second Electrical Terminal; 4: Contact Support; 5: Refrigerant Blocking Structure; 6: Guide Stopper; 7: Connection Terminal; 8: Stationary Contact Member; 9: Movable Contact Member;

11: Housing; 12: Cover plate; 121: Opening;

41: Bracket; 42: Indicating Member; 421: Wear-Resistant Damping Member;

51: Extension Member; 511: Avoidance Slot; 52: Function member.

DETAILED DESCRIPTION

The technical solutions in exemplary embodiments of the disclosure will be clearly and completely described with reference to the drawings about the exemplary embodiments of the disclosure. The example embodiments described herein are only for the purpose of illustration, not for limiting the scope of protection of the disclosure. Therefore, it should be understood, various modifications and changes can be made to the example embodiments without departing from the scope of protection of the disclosure.

In the description of the disclosure, the terms "first" and "second" are only used for descriptive purposes, and cannot be understood as indicating or implying relative importance, unless otherwise specified and limited. The term "a plurality" means two or more, and the term "and/or" includes any and all combinations of one or more associated listed items. In particular, the reference to "the/said" object or "an" object is also intended to indicate one of a possible number of such objects.

Unless otherwise specified or stated, the terms "connected" and "fixed" should be understood broadly. For example, "connected" can refer to a fixed connection, a detachable connection, an integral connection, an electrical connection, or a signal connection, and "connected" can be directly connected or indirectly connected through an intermediary. For those skilled in the art, the specific meanings of the above terms in the disclosure can be understood according to specific situations.

Further, in the description of the disclosure, it should be understood, the locative words such as "above." "below." "inside," and "outside" described in the exemplary embodiments of the disclosure are described from the angle shown in the drawings, and should not be understood as limiting the exemplary embodiments of the disclosure. It should also be understood, in the context, when an element or feature is mentioned to be connected to another element (s) "above." "below." "inside," and "outside," it can not only be directly connected to another element (s) "above," "below," "inside," and "outside," but also can be indirectly connected to another element (s) "above." "below," "inside," and "outside," by an intermediate element.

Example embodiments will now be described more fully with reference to the accompanying drawings. However, the example embodiments can be implemented in various forms and should not be construed as limited to the embodiments set forth herein. On the contrary, these embodiments are provided so that the disclosure will be thorough and complete, and will fully cover the concept of example embodiments to those skilled in the art. The same reference numerals in the drawings indicate the same or similar structures, so their detailed description will be omitted.

The embodiments provide an air conditioning system, which is mainly used in buildings of residential or commercial buildings. The power required for the air conditioning system is supplied by a power grid, wherein the power grid is specifically an interconnection network that transmits power from producers to consumers.

The air conditioning system provided by the embodiments includes an outdoor unit, an indoor unit, and a compressor. The compressor is used to circulate a refrigerant between the outdoor unit and the indoor unit, so as to achieve the purpose of refrigeration.

There is a refrigerant in the air conditioning system, such as A2L refrigerant, where "A" means that the refrigerant has an occupational exposure limits (OEL) of ppm or more. According to the burning rate (BV), burning heat (HOC) and lower flammability limit (LFL) of a specific refrigerant, it can be divided into different grades, such as a first grade, a second grade, and a third grade. Among them, the second grade is specifically divided into "2L" and "2," and the grade "2L" indicates that although 2L refrigerant is still regarded as flammable, the flammability of 2L refrigerant is much lower than that of the refrigerant in grade 2 or 3.

If A2L refrigerant is exposed to an energy source with high enough energy, A2L refrigerant would be ignited. For this, the air conditioning system provided in the embodiment includes the contactor for controlling the power supplied to the outdoor unit, and the potential ignition of the refrigerant can be alleviated by using the contactor.

When the contactor turns the circuit on or off, the potential ignition of the refrigerant can be alleviated by the contactor. In some cases, alleviating the potential ignition of A2L refrigerant may mean preventing a possible flame from spreading outside the contactor. For example, if the refrigerant is in contact with the circuit in the contactor, the flame will not spread outside the contactor when the refrigerant is ignited.

Figure 2:
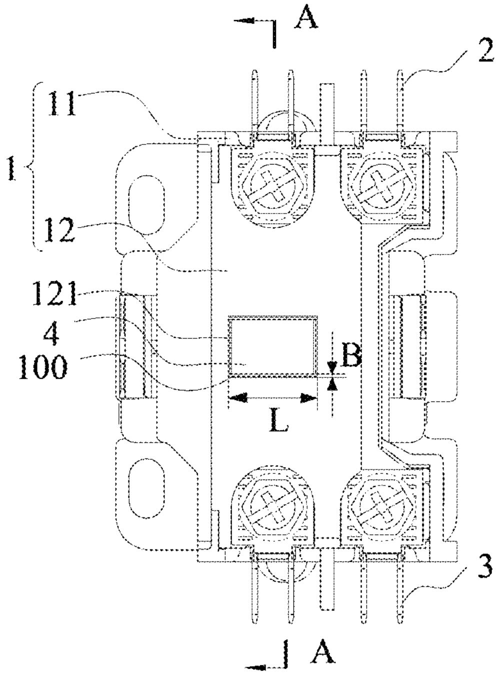
FIG. 2 is a second structural schematic view showing the contact support in the activated state in the contactor provided by the first embodiment of the disclosure.

As shown in FIGS. 1-2, the contactor provided by the embodiment includes a main body 1, a first electrical terminal 2, a second electrical terminal 3, and a contact support 4. The main body 1 plays the role of overall support. The first electrical terminal 2 is arranged on the main body 1. The first electrical terminal 2 may also be called a line-side electrical terminal, and is configured to receive power from the power grid. The second electrical terminal 3 is arranged on the main body 1. The second electrical terminal 3 may also be called a load-side electrical terminal, and is configured to transmit at least part of power to a load. The contact support 4 is at least partially arranged in the main body 1 and arranged between the first electrical terminal 2 and the second electrical terminal 3. The contact support 4 may also be called a switching element, and is configured to be electrically connected to the first electrical terminal 2 and the second electrical terminal 3 respectively when activated, such that the power received by the first electrical terminal 2 from the power grid is at least partly transmitted to the load through the second electrical terminal 3.

In the contactor provided by the embodiment, the contact support 4 is arranged in the main body 1 and arranged between the first electrical terminal 2 and the second electrical terminal 3, such that the first electrical terminal 2 is selectively electrically connected to the second electrical terminal 3 for turning the electrical connection between the first electrical terminal 2 and the second electrical terminal 3 on or off. When the contact support 4 is activated, the first electrical terminal 2 receives power from the power grid and transmits at least part of the power to a load such as an outdoor unit. When the contact support 4 is not activated, the path transmitting power to the load is cut off, so as to control the power supplied to the load such as the outdoor unit.

It can be understood, the first electrical terminal 2 is arranged on one side of the main body 1, and the second electrical terminal 3 is arranged on the other side of the main body 1. Of course, in some other embodiments, the first electrical terminal 2 and the second electrical terminal 3 may also be arranged on the same side or adjacent sides of the main body 1. In the disclosure, positions of the first electrical terminal 2 and the second electrical terminal 3 are not limited and can be adjusted according to the actual production situation.

In an embodiment, as shown in FIGS. 1-4, the contactor further includes a connection terminal 7 for activating the contact support 4 and allowing power to be transmitted from the first electrical terminal 2 to the second electrical terminal 3. Specifically, the connection terminal 7 can generate a magnetic field, and if there is a magnetic field, the magnetic field can activate the contact support 4. For example, the connection terminal 7 pulls the contact support 4 inwardly, causing one or more stationary contact members 8 and movable contact members 9 to be closed, allowing power to be transmitted between the first electrical terminal 2 and the second electrical terminal 3; when the magnetic field does not exist, the stationary contact member 8 and the movable contact member 9 remain disconnected, and power cannot be transmitted from the first electrical terminal 2 to the second electrical terminal 3. The generation of the magnetic field depends on the power supplied to the connection terminal 7. For example, if the power supply is turned off, the magnetic field may not exist, which means the stationary contact member 8 and the movable contact member 9 will remain disconnected.

In an embodiment, as shown in FIGS. 1-2, the main body 1 is provided with an opening 121, and the contact support 4 and the opening 121 are arranged correspondingly. The opening 121 is used for relieving the refrigerant.

If the contactor has an effective opening size satisfy the following requirements, it can be judged as a non-potential ignition source:

$$d_{eff} \leq 22.3 \times S_u^{-1.09} \text{ (in mm)} \leq 7 \text{ mm}$$

$d_{eff}$ represents the effective opening size of the opening 121 in mm;

$S_u$ represents the burning rate of the refrigerant in cm/s.

For example: if the burning rate of A2L refrigerant is $S_u$=6.7 cm/s, then $22.3 \times 6.7^{-1.09} = 2.8$ mm.

The effective opening size of the contactor is calculated as follows:

$$d_{eff} = 4 \times A/S$$

where A represents the area of the opening 121 in $mm^2$; and

S represents the perimeter length of the opening 121 in mm.

Therefore, it is only necessary to limit the effective opening size of the opening 121 in the contactor to be less than the opening limit of the corresponding refrigerant, and then the contactor can be applied in an air conditioning system with A2L refrigerant.

Among them, the opening 121 is specifically a through hole with a rectangular structure; furthermore, the long side direction of the opening 121 is defined as a first direction, the short side direction of the opening 121 is defined as a second direction, and the depth direction of the through hole is defined as a third direction. The first direction, the second direction, and the third direction are perpendicular to each other. The first direction, the second direction, and the third direction only represent spatial directions and have no substantive significance.

By limiting the size of the opening 121, the requirements about the standard opening limit can be satisfied, and an observation function can be retained by using the opening 121. Meanwhile, the operator can manually push the top surface of the contact support 4 for manually activating or deactivating the contact support 4, or touch the contact support 4 by using a tool such as a rod member.

If the size of the opening 121 is relatively small, it is inconvenient to observe, and the equipment accuracy for checking the distance and over travel is very high, moreover, pressing the contact support 4 through the opening 121 can only be performed by special tools, which is adverse for checking whether the contact support 4 is stuck.

In order to solve such problems, as shown in FIGS. 1-2, the contactor provided by the embodiment further includes a refrigerant blocking structure 5. The refrigerant blocking structure 5 is arranged on the side of the main body 1 toward the contact support 4, and the refrigerant blocking structure 5, the contact support 4, and the opening 121 are arranged correspondingly, and the refrigerant blocking structure 5 at least partially surrounds the outside of the contact support 4 for blocking the flame generated by igniting of the refrigerant.

In the contactor provided by the embodiment, the refrigerant blocking structure 5, the contact support 4, and the opening 121 are arranged correspondingly. The refrigerant blocking structure 5 is arranged on the side of the main body 1 toward the contact support 4, which is equivalent to the refrigerant blocking structure 5 is arranged to the position of the opening 121 and on the inner side of the main body 1. The refrigerant blocking structure 5 is arranged in a direction toward the contact support 4, and the refrigerant blocking structure 5 at least partially surrounds the outside of the contact support 4, playing a role of surrounding and encircling the contact support 4, such that during the whole movement of the contact support 4, the opening 121 can satisfy the limit requirements corresponding to A2L refrigerant. If without the refrigerant blocking structure 5, when the contact support 4 moves to a certain position, the limit of the opening 121 will exceed the standard opening limit. Meanwhile, the size of the opening 121 can be kept without reduction, and the top surface of the contact support 4 can be observed outside the main body 1. When a quick maintenance is completed by the operator, the fault, such as a contact fusion in the contactor, can be eliminated without disassembly, so as to solve a fault such as the contact support 4 being stuck and facilitate subsequent production and maintenance.

Therefore, for an air conditioning system using A2L refrigerant, the contactor provided by the embodiment is a non-potential ignition source, which does not meet the conditions for igniting A2L refrigerant, and the contactor can simultaneously satisfy dual functions of blocking the flame generated by a refrigerant ignition and facilitating user observation and troubleshooting.

Specifically, as shown in FIGS. 1-2, a gap 100 is arranged between the refrigerant blocking structure 5 and the contact support 4, and the effective opening size of the gap 100 is less than or equal to the threshold size of the standard opening limit.

For example, if the length L of the gap 100 in the first direction is 13 mm, the width B of the gap 100 in the second direction is 0.5 mm, the effective opening size of the gap 100 is $d_{eff}$=4×A/S=(13*0.5)*4/((13+0.5)*2)=0.96 mm, then $d_{eff}<22.3\times S_u^{-1.09}$ (in mm)=2.8 mm.

By providing the gap 100 between the circuit of the contactor and the refrigerant blocking structure 5 and limiting the effective opening size of the circuit and the gap 100, a quenching effect can be generated, which can prevent or at least alleviate the contact between A2L refrigerant and the circuit in the contactor, so as to prevent the flame from spreading outside the contactor, such that the contactor can have the function of being compatible with A2L refrigerant and be helpful for alleviating the potential ignition of A2L refrigerant.

In an embodiment, the threshold size of the standard opening limit is 2.8 mm.

The threshold size of the standard opening limit is matched with A2L refrigerant, and the threshold size of the standard opening limit can be calculated according to the burning rate $S_u$ of A2L refrigerant, which can directly at least alleviate, prevent, or block the potential ignition of A2L refrigerant.

In an embodiment, as shown in FIGS. 1-2, the main body 1 includes a housing 11 and a cover plate 12. The contact support 4, the first electrical terminal 2, and the second electrical terminal 3 are at least partially arranged in the housing 11. The housing 11 is provided with an open end, the cover plate 12 covers the open end of the housing 11. The opening 121 and the refrigerant blocking structure 5 are arranged in the cover plate 12.

Among them, the cover plate 12 is arranged at the open end of the housing 11 in the third direction, which is equivalent to the cover plate 12 covers the top of the housing 11 to form a bracket structure for supporting the contact support 4, the first electrical terminal 2, and the second electrical terminal 3. The opening 121 is arranged in the cover plate 12 for observing the movement of the contact support 4 or manually activating or deactivating the contact support 4. The refrigerant blocking structure 5 is arranged in the side of the cover plate 12 toward the housing 11 for blocking the flame generated by refrigerant ignition.

Figure 3:
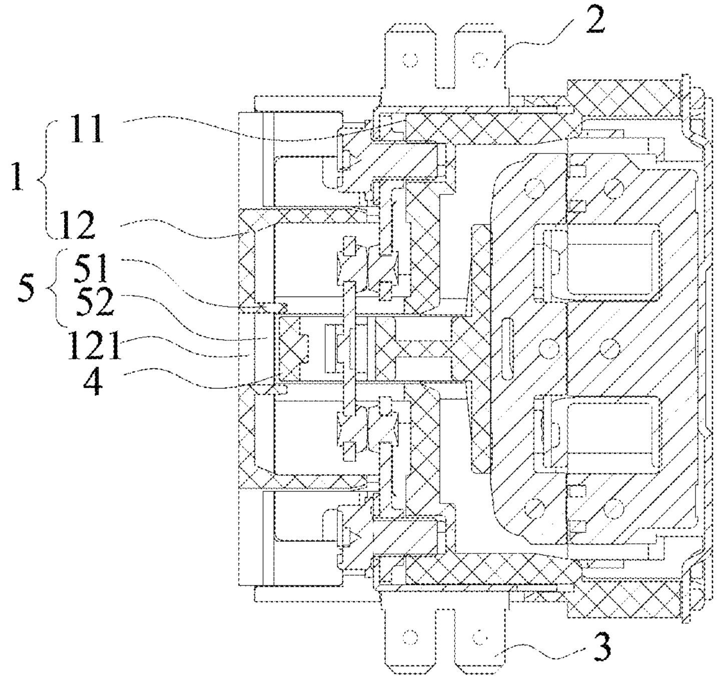
FIG. 3 is a sectional view showing the contactor provided by the first embodiment of the disclosure.
Figure 4:
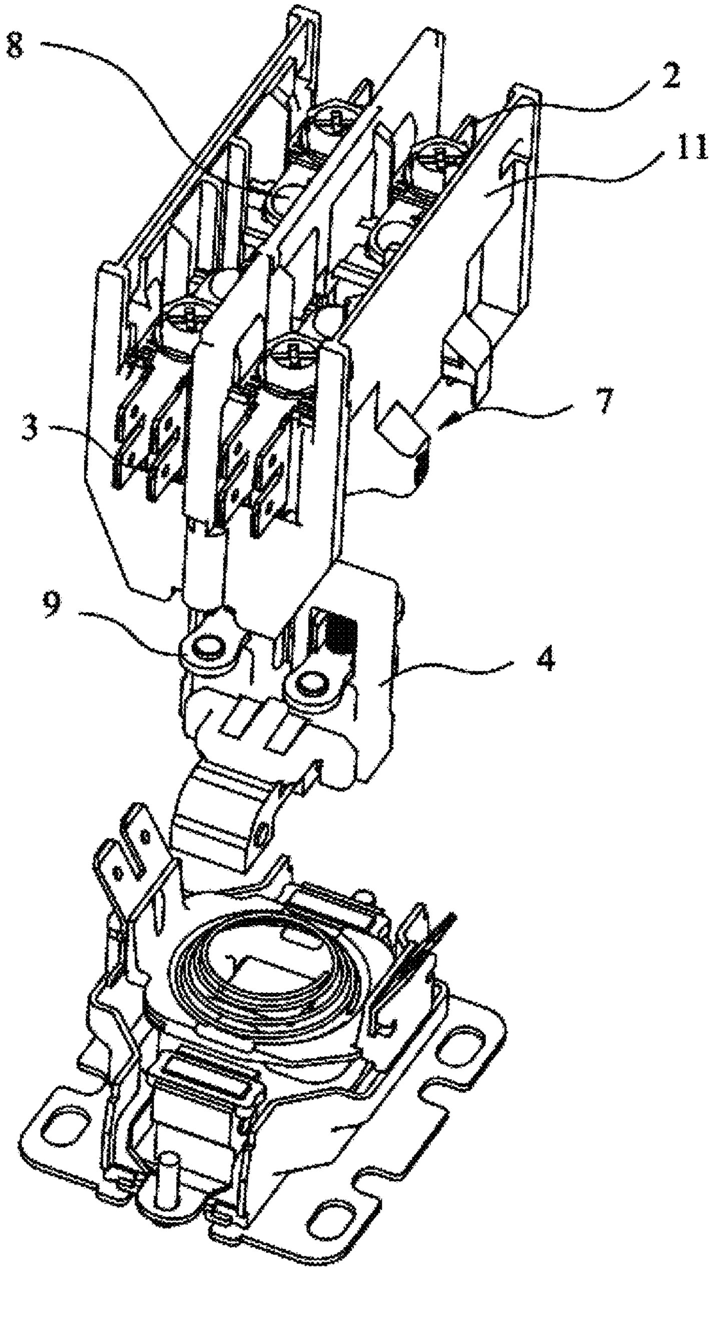
FIG. 4 is an internal exploded schematic view showing the contactor provided by the first embodiment of the disclosure.

In an embodiment, as shown in FIGS. 1 and 3, the refrigerant blocking structure 5 includes an extension member 51. The extension member 51 is arranged along an edge of the opening 121 and protrudes on an inner side of the main body 1 in a direction toward the contact support 4.

In other words, the extension member 51 is formed at a position corresponding to the opening 121 and extends on the inner side of the cover plate 12 in the direction toward the contact support 4. The extension member 51 can match the movement track of the contact support 4 to the greatest extent, so as to block the flame generated by refrigerant ignition during the movement of the contact support 4.

In an embodiment, the first electrical terminal 2 and the second electrical terminal 3 are respectively arranged on two sides of the long edges of the opening 121, i.e., the first electrical terminal 2 and the second electrical terminal 3 are respectively arranged on two sides of the opening 121 along the first direction. When the first electrical terminal 2 and the second electrical terminal 3 are in contact with each other or a moving contact and a stationary contact are in contact with each other, it is easy to generate an electric arc, and the electric arc is a potential ignition source of the refrigerant, which will lead to the ignition of the refrigerant and the explosion.

In an embodiment, the extension member 51 is arranged along a long edge of the opening 121.

Since the electric arc is most likely to be generated in the first direction, arranging the extension member 51 along the long edge of the opening 121 can cut off or block the generation path of the electric arc to a certain extent, such that the gap 100 between the extension member 51 and the contact support 4 does not meet the conditions for igniting A2L refrigerant.

It can be understood, the opening 121 with a rectangular structure has two long edges, and the number of the extension member 51 can be provided in two. The two extension members 51 are arranged opposite to each other and are arranged respectively on the two sides of the cover plate 12 in the first direction, and the two extension members 51 are corresponding to the two long edges of the opening 121. At this time, the refrigerant blocking structure 5 is in an opened structure with two ends along the second direction for forming a semi-enclosed structure for the contact support 4.

In an embodiment, as shown in FIGS. 1 and 3, the refrigerant blocking structure 5 further includes a function member 52. The function member 52 is arranged along a short edge of the opening 121 and is arranged on the inner side of the main body 1.

In other words, the function member 52 is arranged on an inner side of the cover plate 12 at a position corresponding to a short side of the opening 121. The function member 52 plays an auxiliary role in blocking the electric arc, and the function member 52 can at least partially close an opened end of the opened structure. Under cooperation of the extension members 51 and the function member 52, the reliability of blocking the flame generated by refrigerant ignition is improved, such that the entire gap 100 between the refrigerant blocking structure 5 and the contact support 4 does not meet the conditions for igniting A2L refrigerant.

It can be understood, the number of the function member 52 can be provided in one or two. If one function member 52 is provided, the function member 52 is arranged along one of the short sides of the opening 121. At this time, the whole refrigerant blocking structure 5 is similar to a U-shaped structure, and the U-shaped structure forms a three-sided surrounding structure for the contact support 4. If two function members 52 are provided, the two function members 52 are arranged opposite to each other and respectively on two sides of the cover plate 12 in the second direction, and the two function members 52 are corresponding to the two short edges of the opening 121. At this time, the refrigerant blocking structure 5 forms a fully enclosed structure for the contact support 4.

Figure 5:
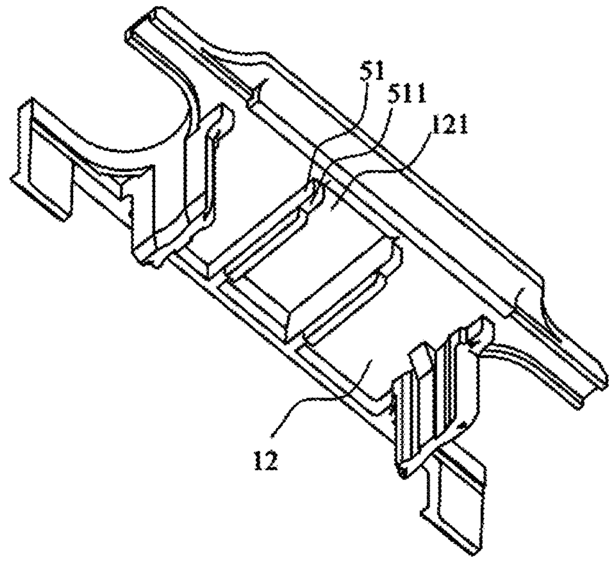
FIG. 5 is a first structural schematic view showing a cover plate in the contactor provided by the first embodiment of the disclosure.

In an embodiment, as shown in FIGS. 3 and 5, the function member 52 is a reinforcing rib or rim arranged on the inner side of the cover plate 12.

The inner side of the cover plate 12 can be provided with a reinforcing rib for strengthening the structural strength of the cover plate 12, and the inner side of the cover plate 12 can also be provided with a rim which can enclose, support or limit the internal elements of the contactor. When the function member 52 adopts the reinforcing rib or the rim, it is equivalent to utilizes the reinforcing rib or the rim of the existing cover plate 12 and uses local materials, resulting in a relatively low production cost of raw materials. Meanwhile, with the cover plate 12 and the housing 11, a refrigerant blocking structure 5 encircling and surrounding the contact support 4 can be formed.

In an embodiment, the main body 1 and the refrigerant blocking structure 5 are integrally formed.

Specifically, the cover plate 12 of the main body 1 and the extension members 51 are integrally formed; or alternatively, the cover plate 12 and the function member 52 are integrally formed; or alternatively, the cover plate 12, the extension members 51, and the function member 52 are integrally formed. Such integrated structure can reduce the assembly processes in parts assembling, thus lowering the production cost.

In an embodiment, along the moving direction of the contact support 4, the height of the function member 52 is less than or equal to the height of the extension members 51.

Since the extension member 51 plays a major role in blocking and the function member 52 plays an auxiliary role in blocking, the height of the function member 52 in the third direction is set to be less than that of the extension member 51, the extension member 51 can maximize the blocking effect, so as to reduce the risk of the self-ignition of the refrigerant and improve the safety and reliability.

Figure 6:
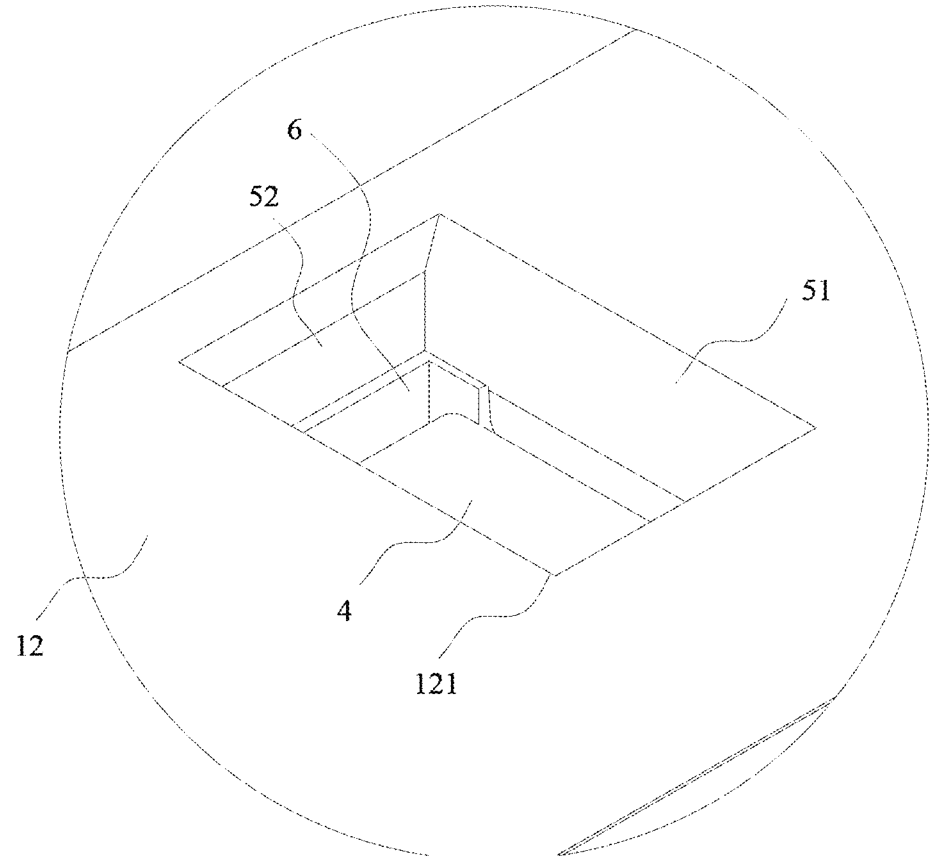
FIG. 6 is a structural schematic view showing a refrigerant blocking structure in the contactor provided by the first embodiment of the disclosure.

In an embodiment, as shown in FIG. 6, the contactor further comprises a guide stopper 6, and the guide stopper 6 is arranged on the side of the function member 52 toward the contact support 4. The guide stopper 6 is used for limiting and guiding the contact support 4.

Since the contact support 4 will move in the third direction, the guide stopper 6 can be used to limit the contact support 4, so as to avoid the contact support 4 from position offsetting during the movement and improve the verticality of the movement track. The guide stopper 6 can also guide the contact support 4, so as to ensure smoothness of the contact support 4 in moving. The guide stopper 6 is optionally arranged on the side of the function member 52 toward the contact support 4. The guide stopper 6 is not arranged on the extension members 51 in order to reduce interference with the blocking function of the extension members 51. In addition, the guide stopper 6 is arranged between the function member 52 and the contact support 4 to play a role of blocking the function member 52 and the contact support 4, which can increase the slit between the function member 52 and the contact support 4 to a certain extent, so as to reduce the contact area of the contact support 4 with respect to the cover plate 12, thereby reducing the risk of the contact support 4 being stuck. In addition, the guide stopper 6 plays a role of bearing the contact support 4, so as to reduce the mutual contact surface and friction between the contact support 4 and the housing 11, thereby reducing the risk of debris falling due to friction.

In an embodiment, as shown in FIG. 6, the guide stopper 6 has an L-shaped structure or a U-shaped structure.

The guide stopper 6 in an L-shaped structure or a U-shaped structure can at least partially cover or surround the contact support 4, so as to improve the limiting effect on the contact support 4. In addition, the guide stopper 6 can supplement the blocking effect of the refrigerant blocking structure 5.

Figure 7:
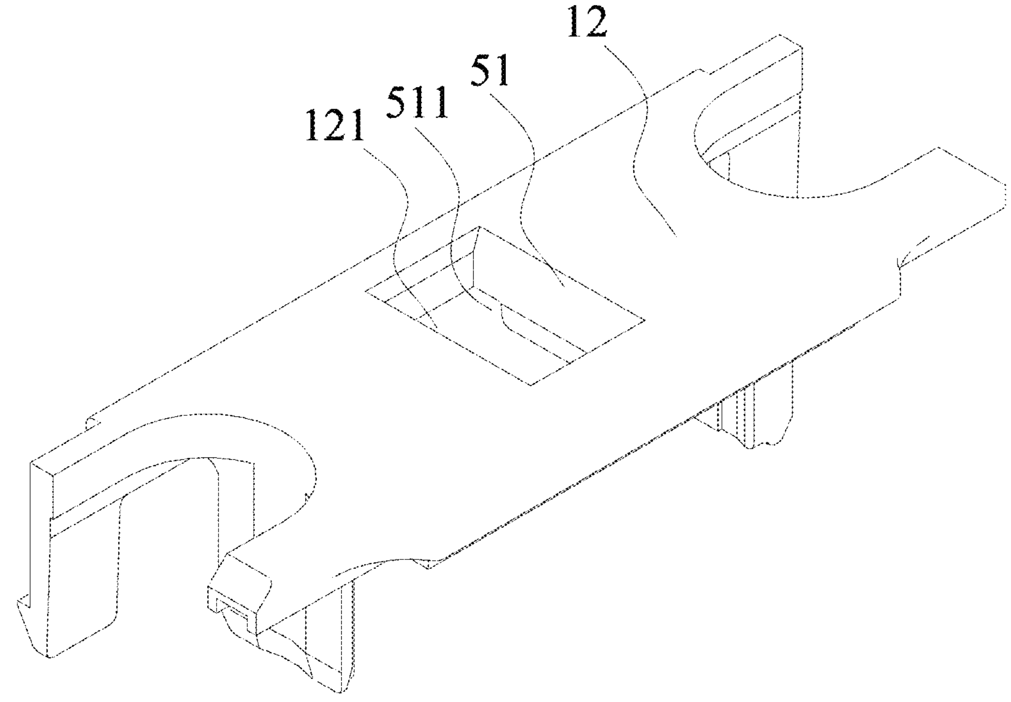
FIG. 7 is a second structural schematic view showing the cover plate in the contactor provided by the first embodiment of the disclosure.

In an embodiment, as shown in FIG. 7, the extension member 51 is provided with an avoidance slot 511 for avoiding the guide stopper 6.

The corner position of the guide stopper 6 may interfere with the extension members 51, and the extension members 51 is provided with the avoidance slot 511 for avoiding the corner position of the guide stopper 6, so as to prevent interference with the extension members 51 and ensure the reliability of the extension members 51 in realizing function.

Specifically, the guide stopper 6 includes a first connection portion and a second connection portion perpendicular to each other. The first connection portion is arranged on the function member 52, and the second connection portion is arranged perpendicularly with respect to the first connection portion. The avoidance slot 511 of the extension members 51 can also be called a notch, and the avoidance slot 511 is used to avoid the second connection portion. It can be understood, if the number of the second connection portion is provided in one, the guide stopper 6 is in an L-shaped structure; and if the number of the second connection portion is provided in two, the two second connection portions are respectively arranged at two ends of the first connection portion, and the guide stopper 6 is similar in a U-shaped structure.

It can be understood that the extension members 51 may also be provided with no any avoidance slot 511. In such case, the corner position of the guide stopper 6 toward the extension member 51 may be provided with a groove, and the groove at least partially accommodates the extension member 51, such that the side of the extension member 51 toward the contact support 4 and the side of the guide stopper 6 toward the contact support 4 are approximately flush.

If both the cover plate 12 and the contact support 4 in the main body 1 are made of a non-wear-resistant thermosetting material, the refrigerant blocking structure 5 and the contact support 4 will rub against each other when the contact support 4 moves, resulting in a large amount of dust.

Figure 8:
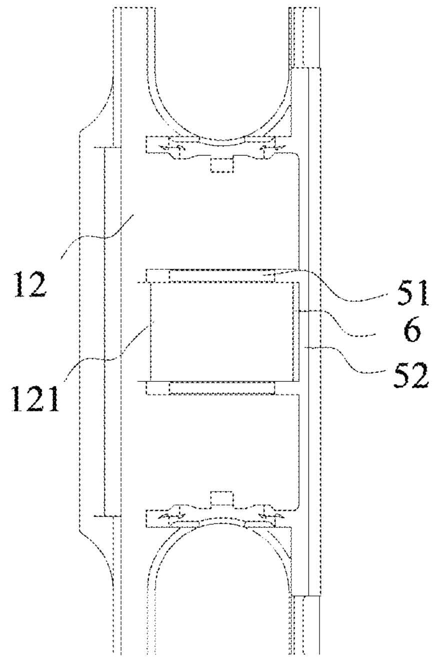
FIG. 8 is a third structural schematic view showing the cover plate in the contactor provided by the first embodiment of the disclosure.
Figure 9:
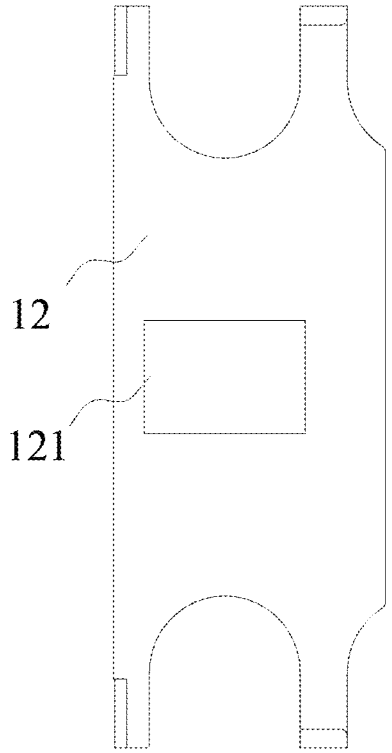
FIG. 9 is a fourth structural schematic view showing the cover plate in the contactor provided by the first embodiment of the disclosure.

To solve this problem, as shown in FIGS. 8-9, both the cover plate 12 of the main body 1 and the refrigerant blocking structure 5 are made of at least one of a self-lubricating material and a wear-resistant material. For example, the wear-resistant material may be chosen from PA66, PA6, PBT, and PET. Among them, PA66 and PA6 belong to PA, and PA may also be collectively called as nylon.

Specifically, when the contact support 4 moves, it will rub against the refrigerant blocking structure 5. Since the refrigerant blocking structure 5 has a wear resistance, the generated dust can be reduced during the movement of the contact support 4, thereby improving environmental protection effect and prolonging product life.

Figure 10:
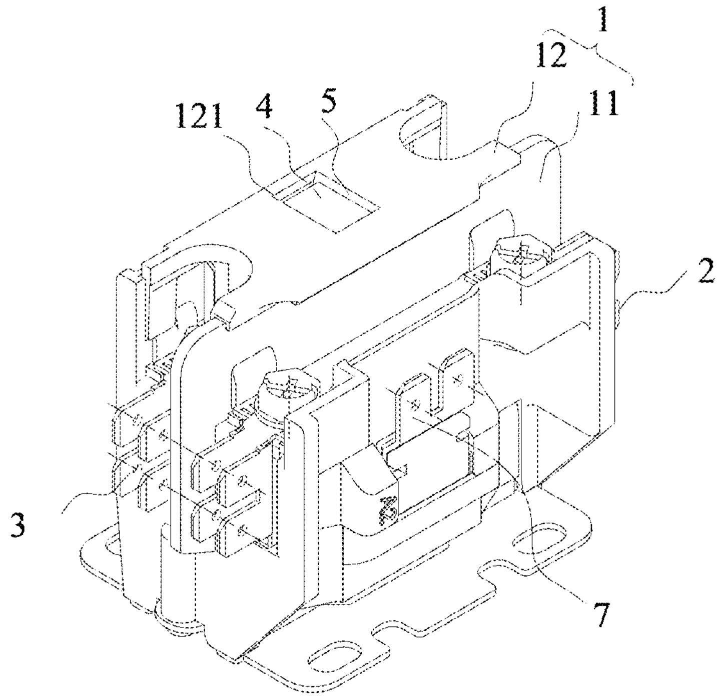
FIG. 10 is a first structural schematic view showing the contact support in an inactive state in the contactor provided by the first embodiment of the disclosure.
Figure 11:
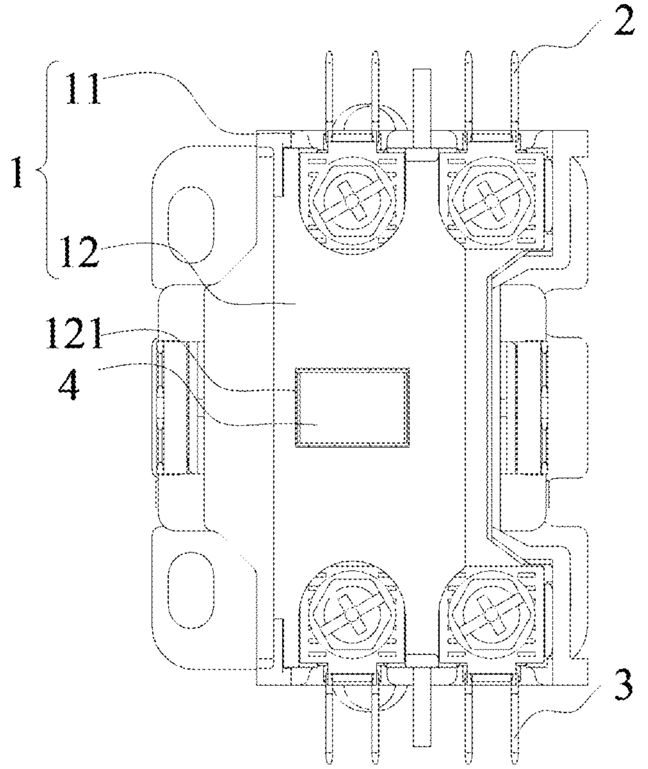
FIG. 11 is a second structural schematic view showing the contact support in the inactive state in the contactor provided by the first embodiment of the disclosure.

In an embodiment, as shown in FIGS. 10-11, the cover plate 12 of the main body 1 includes an upper surface, the opening 121 is arranged on the upper surface, and the top surface of the contact support 4 is always located below the upper surface.

Specifically, when the contact support 4 is activated (as shown in FIGS. 1-2), the contact support 4 moves downward in the third direction for suction, and the top surface of the contact support 4 is located below the upper surface of the cover plate 12; when the contact support 4 is not activated (as shown in FIG. 10-11), the contact support 4 moves upward and pops up in the third direction, and the top surface of the contact support 4 is located below the upper surface of the cover plate 12. Therefore, regardless of the state of the contact support 4, the top surface of the contact support 4 is always located below the upper surface of the cover plate 12, so as to avoid the contact support 4 from being exposed.

Figure 12:
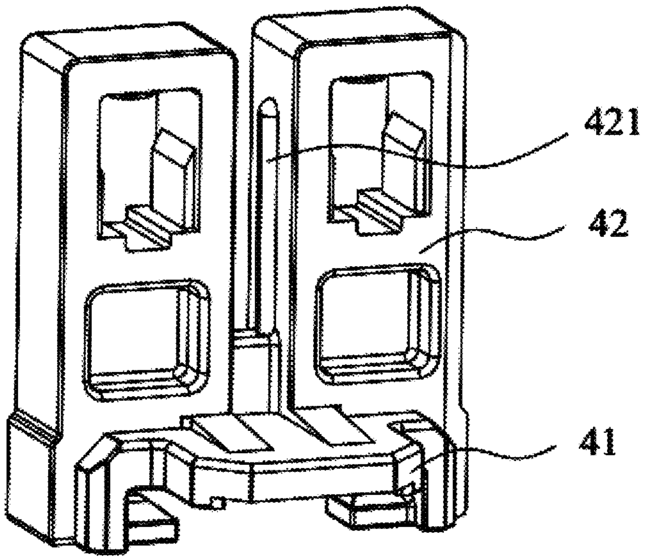
FIG. 12 is a structural schematic view showing the contact support in the contactor provided by a second embodiment of the disclosure.
Figure 13:
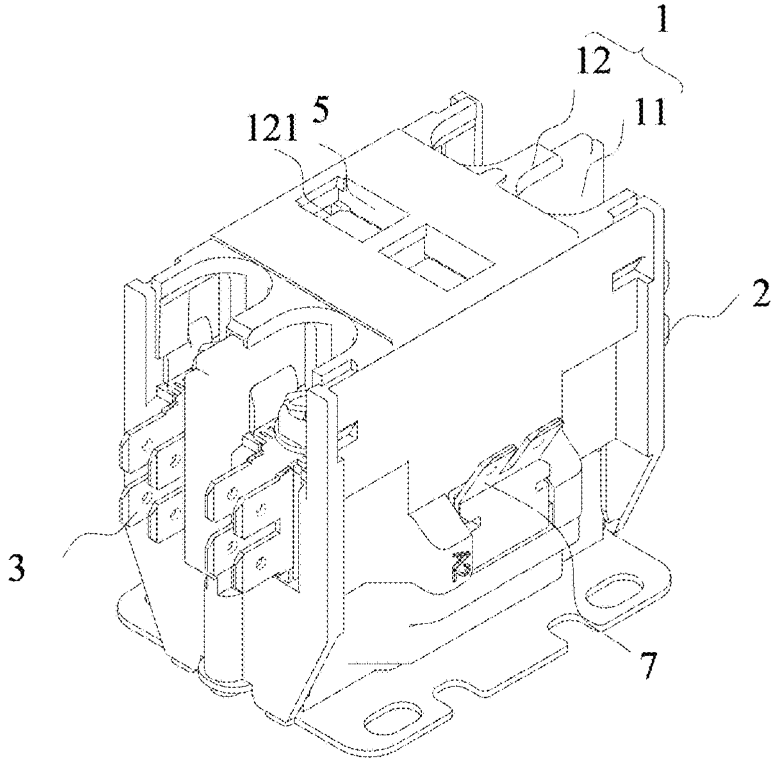
FIG. 13 is a first structural schematic view showing the contact support in the activated state in the contactor provided by the second embodiment of the disclosure.
Figure 14:
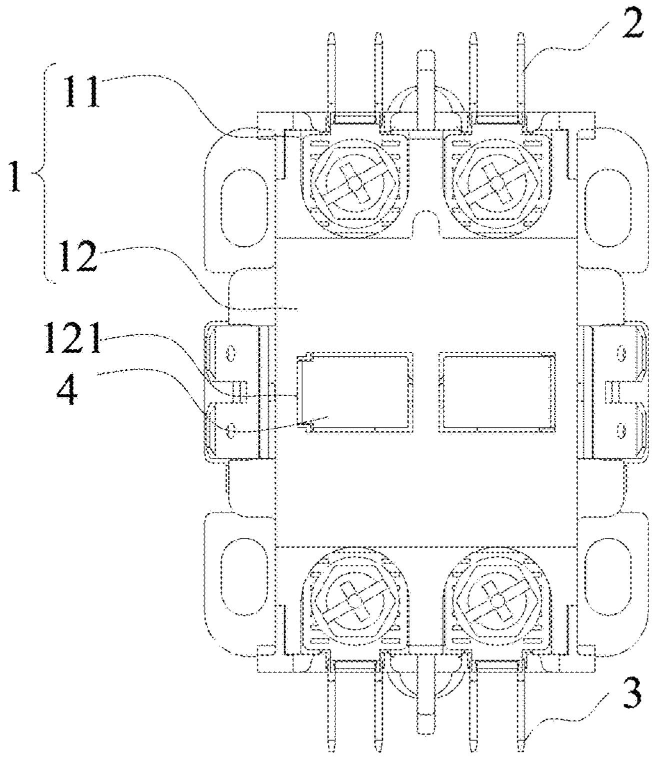
FIG. 14 a second structural schematic view showing the contact support in the activated state in the contactor provided by the second embodiment of the disclosure.
Figure 15:
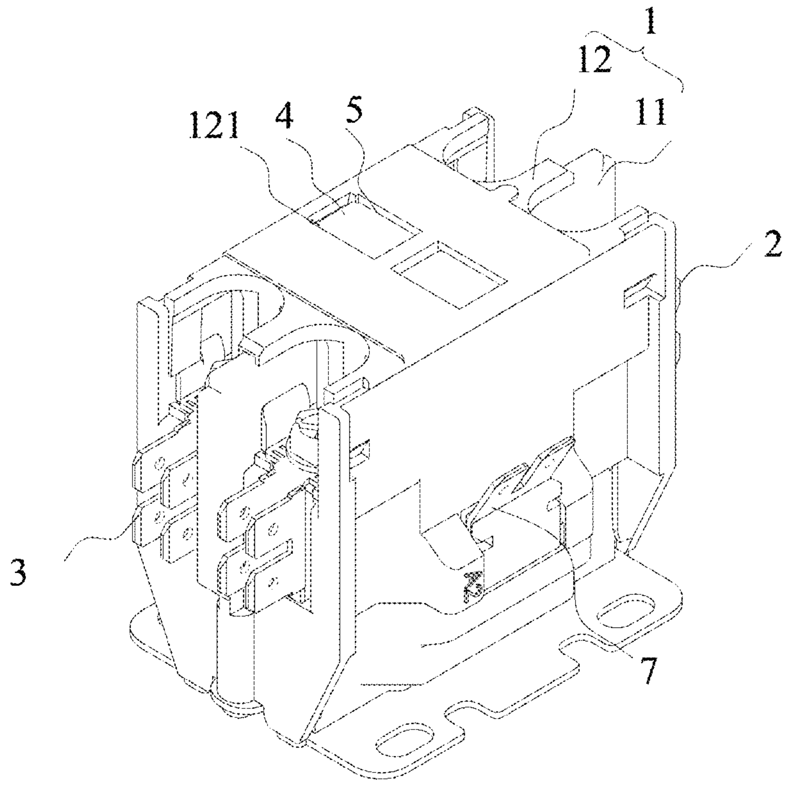
FIG. 15 a first structural schematic view showing the contact support in the inactive state in the contactor provided by the second embodiment of the disclosure.
Figure 16:
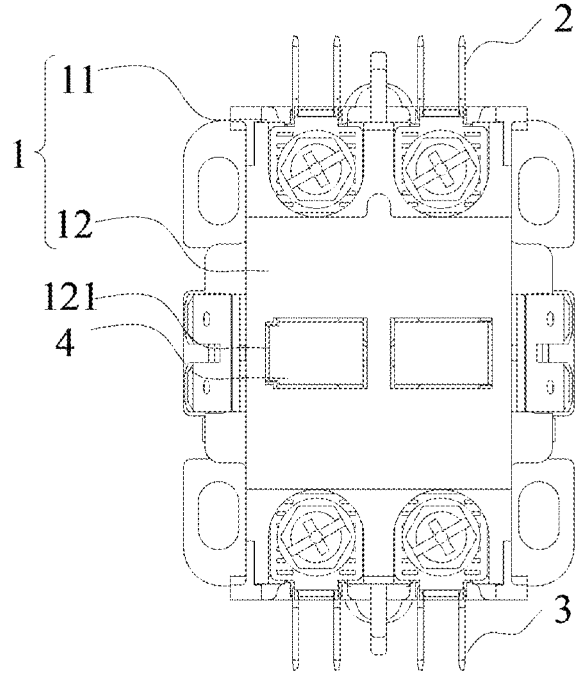
FIG. 16 is a second structural schematic view showing the contact support in the inactive state in the contactor provided by the second embodiment of the disclosure.
Figure 17:
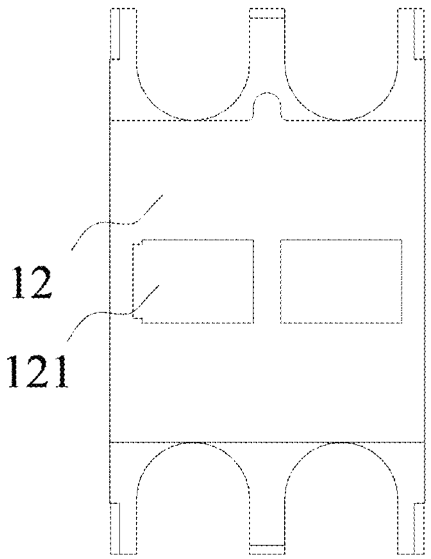
FIG. 17 is a first structural schematic view showing the cover plate in the contactor provided by the second embodiment of the disclosure.
Figure 18:
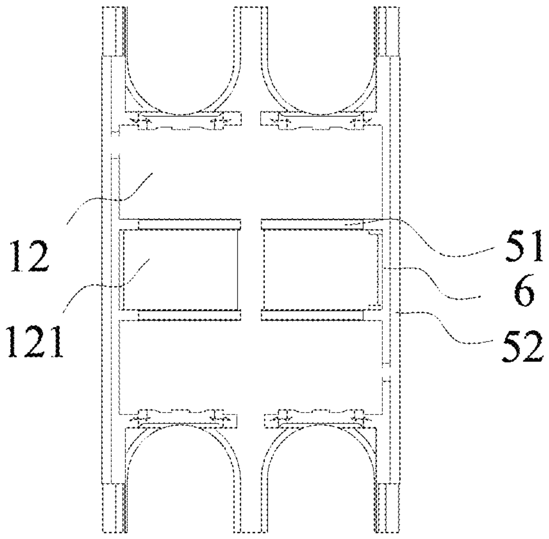
FIG. 18 is a second structural schematic view showing the cover plate in the contactor provided by the second embodiment of the disclosure.
Figure 19:
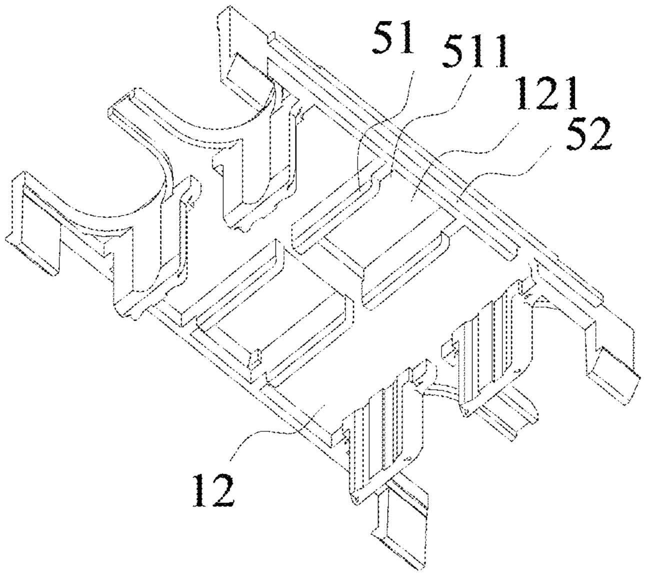
FIG. 19 is a third structural schematic view showing the cover plate in the contactor provided by the second embodiment of the disclosure.

In an embodiment, as shown in FIG. 12, the contact support 4 includes a bracket 41 and an indicating member 42 arranged at the top of the bracket 41. The indicating member 42 passes through the opening 121 and is in sliding fitting with it.

In the third direction, the indicating member 42 protrudes from the top surface of the bracket 41. The indicating member 42 can pass through the opening 121, and the operator can observe the position of the indicating member 42 through the opening 121, which is used to indicate whether the contact support 4 is currently in a triggered state or an un-triggered state or a stuck state.

It should be noted particularly, the refrigerant blocking structure 5 is at least partially wrapped around the indicating member of the contact support 4.

In an embodiment, the side of the contact support 4 toward the inner wall of the opening 121 is provided with a wear-resistant damping member 421.

Among them, the wear-resistant damping member 421 can be a protrusion on the outer wall of the indicating member 42, and the wear-resistant damping member 421 is in direct contact with the inner wall of the opening 121 or the refrigerant blocking structure 5, thusly reducing the frictional contact area of the contact support 4 and playing a role of wear resistance and vibration reduction.

It should be noted particularly, the gap 100 between the indicating member 42 and the refrigerant blocking structure 5 is similar to a conical structure, and a small mouth end of the conical structure is arranged toward the cover plate 12, i.e., the gap 100 gradually increases in the third direction and from the bottom to the top of the indicating member 42, which can further reduce the risk of friction between the indicating member 42 and the inner wall of the opening 121 or the refrigerant blocking structure 5.

In an embodiment, the numbers of the first electrical terminal 2 and the second electrical terminal 3 are provided in plurality, and one contact support 4, the plurality of first electrical terminals 2, and the plurality of second electrical terminals 3 are correspondingly arranged.

It can be understood, in different types of contactors, the numbers of the first electrical terminal 2 and the second electrical terminal 3 are different. For example, for a contactor of model XMC0 1P (as shown in FIGS. 1-11), one first electrical terminal 2 and one second electrical terminal 3 are correspondingly arranged to form a set of electrical terminals; and for a contactor of model XMC0 2P (as shown in FIGS. 12-20), two first electrical terminals 2 and two second electrical terminals 3 are correspondingly arranged to form two sets of electrical terminals; furthermore, for a contactor of model XMC0 3P (as shown in FIGS. 21-24), three first electrical terminals 2 and three second electrical terminals 3 are correspondingly arranged to form three sets of electrical terminals. Among them, both the housing 11 and the contact support 4 can be made of thermosetting materials.

The disclosure does not limit the numbers of the first electrical terminal 2 and the second electrical terminal 3, which can be adjusted according to actual production requirements; however, different set of electrical terminals can be corresponding to one contact support 4, so as to ensure the synchronization of the electrical connections.

In an embodiment, the numbers of the opening 121 and the indicating member 42 are provided in plurality, and the plurality of indicating members 42 are arranged corresponding to the plurality of openings 121.

It can be understood, according to different types of contactors, the number of opening 121 can be flexibly selected. That is, the indicating member 42 of one contact support 4 can be corresponding to one opening 121, or alternatively, a plurality of indicating members 42 of one contact support 4 may all be arranged on the bracket, and the plurality of indicating member 42 are corresponding to a plurality of openings 121. The disclosure does not limit the numbers of the opening 121 and the indicating member 42, as long as the openings 121 and indicating members 42 can be corresponding to each other, they are within the protection scope of the disclosure.

Figure 20:
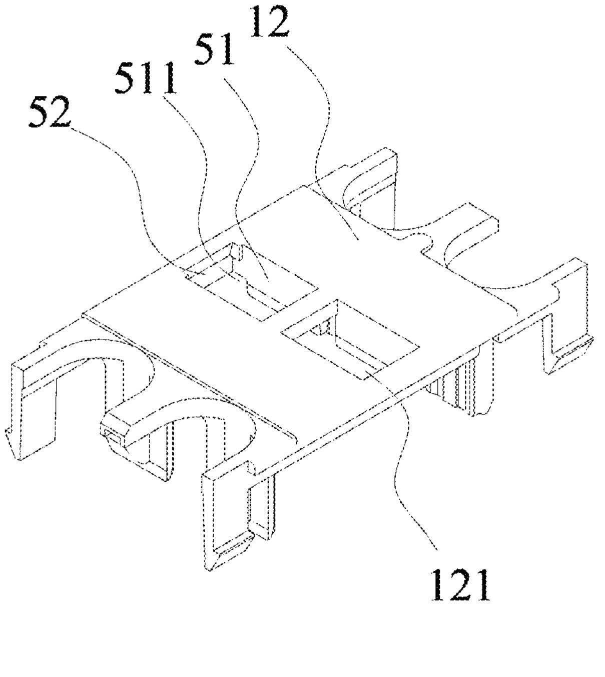
FIG. 20 is a fourth structural schematic view showing the cover plate in the contactor provided by the second embodiment of the disclosure.
Figure 21:
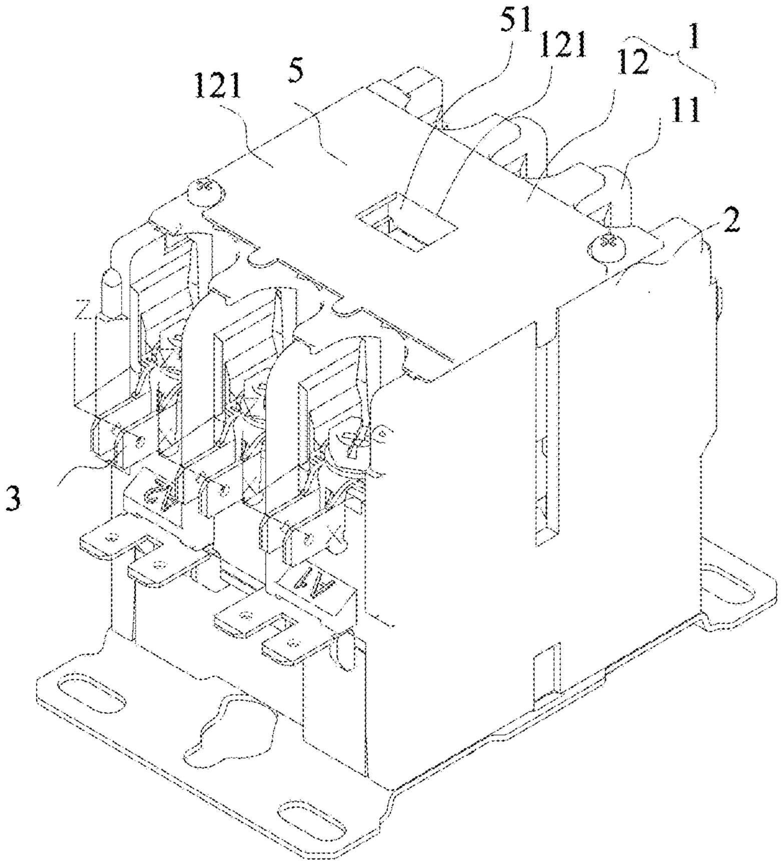
FIG. 21 is a first structural schematic view showing the contact support in the activated state in the contactor provided by a third embodiment of the disclosure.
Figure 22:
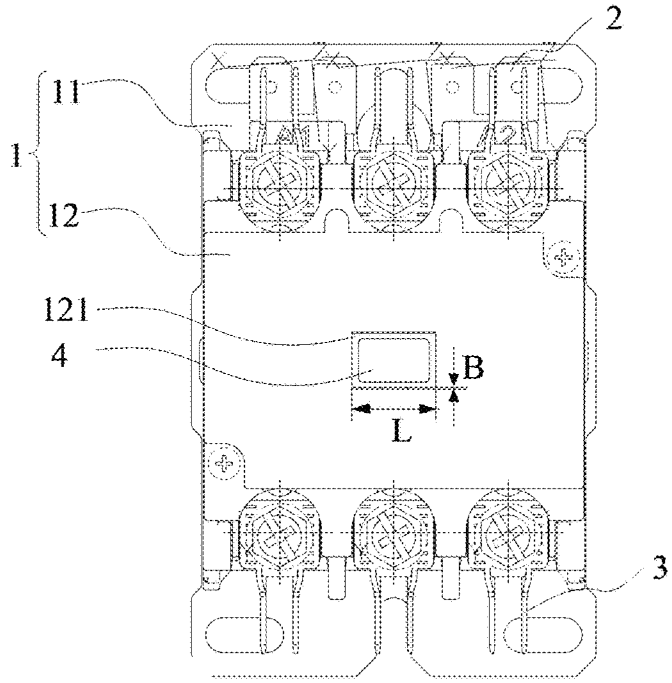
FIG. 22 is a second structural schematic view showing the contact support in the activated state in the contactor provided by the third embodiment of the disclosure.
Figure 23:
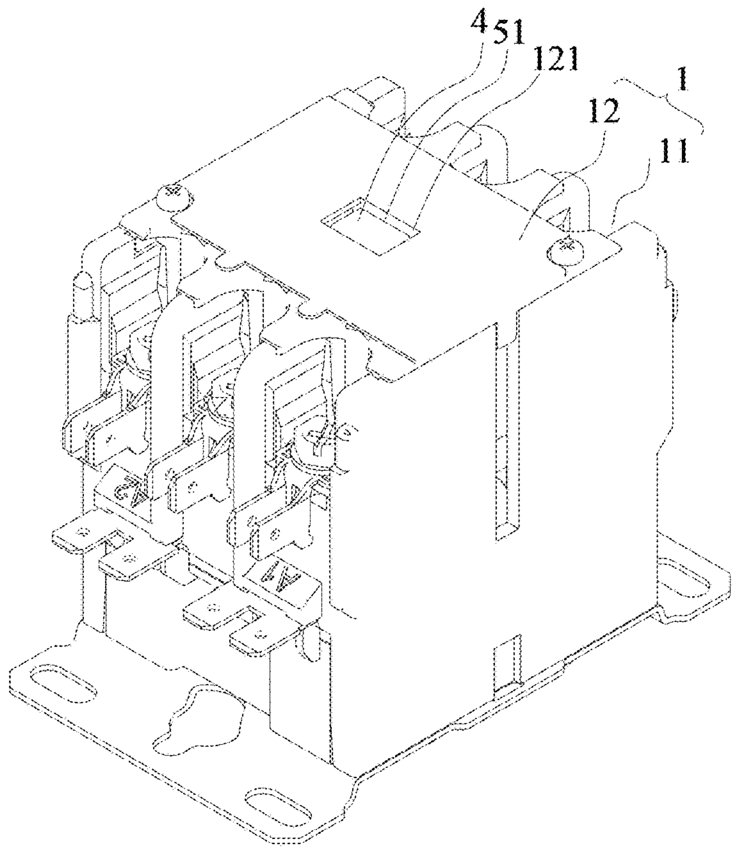
FIG. 23 is a first structural schematic view showing the contact support in the inactive state in the contactor provided by the third embodiment of the disclosure.
Figure 24:
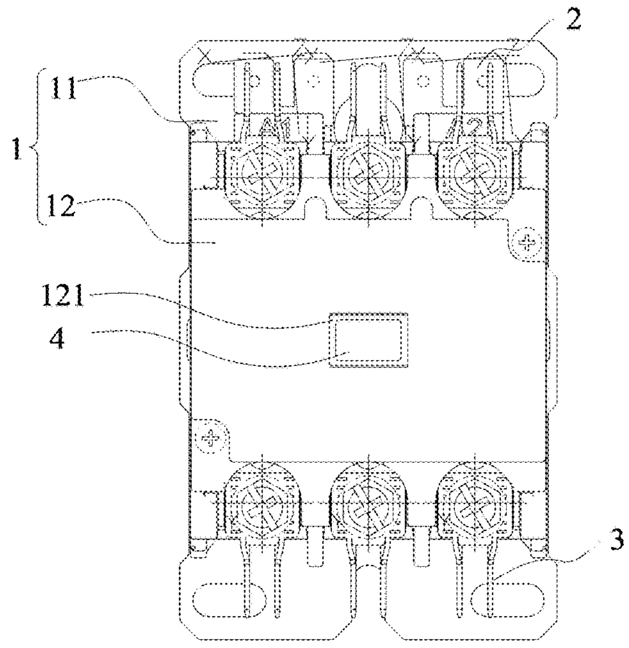
FIG. 24 is a second structural schematic view showing the contact support in the inactive state in the contactor provided by the third embodiment of the disclosure.

In an embodiment, for a contactor of model XMC0 3P. e.g., as shown in FIG. 20, the length L of the gap 100 in the first direction is 12.5 mm, the width B of the gap 100 in the second direction is 0.25 mm, and the effective opening size of the gap 100 is $d_{eff}=4\times A/S=(12.5*0.25)*4/((12.5+0.25)*2)=0.5$ mm, then $d_{eff}<22.3\times S_u^{-1.09}$ (in mm)=2.8 mm. Therefore, the opening 121 of the contactor of model XMC0 3P can satisfy the limit requirements corresponding to A2L refrigerant.

It should be noted here, the contactor shown in the drawings and described in this specification is only one example of applying the principles of the disclosure. Those skilled in the art clearly understand, the principles of the disclosure are not limited to any details or any parts of the device shown in the drawings or described in the specification.

It should be understood, the disclosure is not limited to the specific structure and arrangements of the components set forth in the specification. The disclosure can have other embodiments and be realized and carried out in various ways. The variations and modifications are within the scope of the disclosure. It should be understood, the disclosure described and defined in the specification may extend to all alternative combinations of two or more individual features mentioned or obvious in the text and/or the drawings. All these different combinations constitute various alternative aspects of the disclosure. The embodiments described in the specification indicate the best modes known for carrying out the disclosure, and will enable those skilled in the art to apply the disclosure.

Those skilled in the art, after considering the specification and practicing the creation disclosed herein, will easily think of other embodiments of the disclosure. The disclosure is intended to cover any variation, use or adaptation which follows the general principles of the disclosure and includes common knowledge or common technical means in the technical field that are not mentioned in the disclosure. The specification and exemplary embodiments are to be regarded as exemplary only, and the true scope and spirit of the disclosure is defined by the appended claims.

It should be understood, the disclosure is not limited to the precise structure described above and shown in the drawings, and various modifications and changes can be made without departing from its scope. The scope of protection of the disclosure is limited only by the appended claims.

What is claimed is:

1. A contactor comprising:
- a main body provided with an opening;
- a first electrical terminal, arranged on the main body;
- a second electrical terminal, arranged on the main body;
- a contact support, at least partially arranged in the main body and arranged between the first electrical terminal and the second electrical terminal, the contact support comprising a movable contact member that is configured to be electrically connected to the first electrical terminal and the second electrical terminal when activated, such that a power received by the first electrical terminal from a power grid is at least partially transmitted to a load through the second electrical terminal; and
- a refrigerant blocking structure, arranged on a side of the main body toward the contact support, and the refrigerant blocking structure, the contact support, and the opening being arranged correspondingly, and the refrigerant blocking structure at least partially surrounding an outside of the contact support for blocking a flame generated by igniting of a refrigerant, wherein the refrigerant blocking structure includes:

an extension member, arranged along a long side edge of the opening and protrudes on an inner side of the main body in a direction toward the contact support; and a function member, arranged along a short side edge of a rectangular structure of the opening and arranged on the inner side of the main body.

2. The contactor according to claim 1, wherein the opening has a rectangular structure, and the first electrical terminal and the second electrical terminal are respectively arranged on two sides of long side edge of the rectangular structure.

3. The contactor according to claim 1, wherein the main body includes:

a housing, the contact support, the first electrical terminal, and the second electrical terminal are at least partially arranged in the housing;

a cover plate covering the housing, the opening and the refrigerant blocking structure are arranged in the cover plate; and wherein the function member is a reinforcing rib or a rim arranged on an inner side of the cover plate.

4. The contactor according to claim 3, wherein both the cover plate of the main body and the refrigerant blocking structure are made of at least one of a self-lubricating material and a wear-resistant material.

5. The contactor according to claim 1, wherein a height of the function member is less than or equal to that of the extension member along a moving direction of the contact support.

6. The contactor according to claim 1, wherein the contactor further comprises a guide stopper arranged on a side of the function member toward the contact support, and the guide stopper is used for limiting and guiding the contact support.

7. The contactor according to claim 6, wherein the guide stopper has an L-shaped structure or a U-shaped structure.

8. The contactor according to claim 7, wherein the extension member is provided with an avoidance slot for avoiding the guide stopper.

9. The contactor according to claim 1, wherein the main body and the refrigerant blocking structure are integrally formed.

10. The contactor according to claim 1, wherein the main body includes an upper surface, the opening is arranged on the upper surface, and a top surface of the contact support is always located below the upper surface.

11. The contactor according to claim 1, wherein a side of the contact support toward an inner wall of the opening is provided with a wear-resistant damping member.

12. The contactor according to claim 1, wherein a gap is arranged between the refrigerant blocking structure and the contact support, and an effective opening size of the gap is less than or equal to a threshold size of a standard opening limit.

13. The contactor according to claim 12, wherein the threshold size of the standard opening limit is $22.3 \times S_u^{-1.09}$ (in mm); and wherein, $S_u$ represents a burning rate of a refrigerant in cm/s.

14. The contactor according to claim 1, wherein the numbers of first electrical terminal and the second electrical terminal are provided in plurality, and one contact support, the plurality of first electrical terminals, and the plurality of second electrical terminals are correspondingly arranged.

15. An air conditioning system, wherein the air conditioning system comprises the contactor according to claim 1.

16. The air conditioning system according to claim 15, wherein the air conditioning system further comprises an outdoor unit, and the contactor is electrically connected to the outdoor unit for controlling a power supplied to the outdoor unit.

* * * * *